Aug. 12, 1924.
B. B. PRESTON
VALVE
Filed Aug. 9, 1923
1,504,453
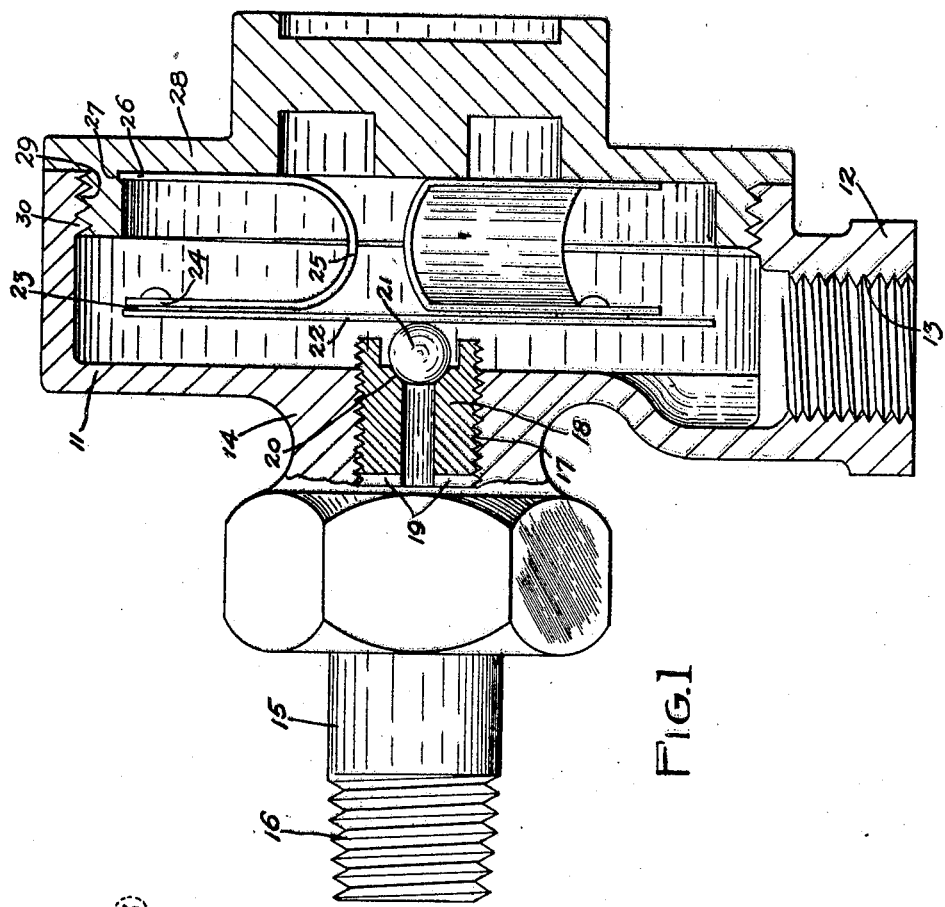
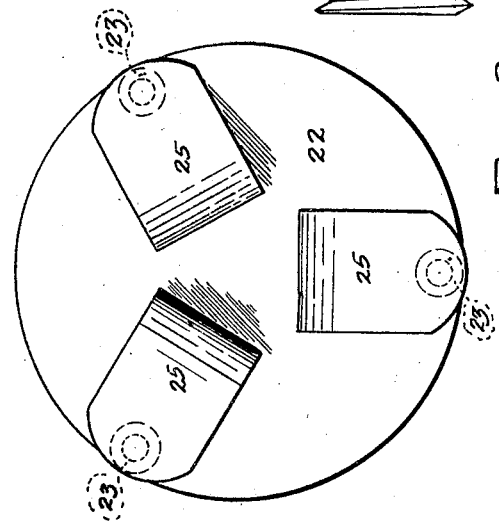
BRUCE B. PRESTON
INVENTOR
ATTORNEYS Patented Aug. 12, 1924.

1,504,453

UNITED STATES PATENT OFFICE.

BRUCE B. PRESTON, OF CLEVELAND, OHIO, ASSIGNOR TO THOMAS G. MOUAT, OF CLEVELAND, OHIO.

VALVE.

Application filed August 9, 1923. Serial No. 656,612.

*To all whom it may concern:*

Be it known that I, BRUCE B. PRESTON, a citizen of the United States, residing at Cleveland, in the county of Cuyahoga and State of Ohio, have invented a certain new and useful Improvement in Valves, of which the following is a full, clear, and exact description, reference being had to the accompanying drawings.

My invention relates to thermostatic radiator valves and the principal object of my invention is to provide a new and improved valve of this type superior to any such valve heretofore known and eliminating at least part of the defects present in valves of this type now in use. In the drawings accompanying this specification and forming a part thereof I have shown, for purposes of illustration, one form which my invention may assume. In these drawings:

Figure 1 is a section through a valve embodying my invention, while

Figure 2 is an elevation of the thermostatic element shown in Figure 1.

The valve disclosed herein comprises a casing member 11 provided upon its periphery with a boss 12 screw threaded interiorly thereof at 13 to receive a suitable discharge pipe (not shown) and provided centrally with a second boss 14 forming one member of a union the other member of which is herein shown as a duct 15 screw threaded as shown at 16 to engage the discharge opening of a radiator. In addition, the boss 14 is screw threaded interiorly at 17 to receive a plug 18 provided on one end with slots 19 to permit adjustment of the plug 18 within the boss 14 by means of a suitable tool such as a screw driver and provided on the other end with a valve seat 20 adapted to be closed by a suitable valve herein shown as a free ball 21 held in closing relation to the valve seat 20 by means of a baffle plate 22 supported through heat insulating washers 23 from the free ends 24 of three U-shaped thermostatic members 25 the other ends 26 of which are positioned within shallow recesses 27 in a second casing member 28 which is secured to the casing member 11 by means of a screw threaded portion 29 adapted to enter the casing member 11 and cooperate with the screw threads 30 carried thereby.

In operation with the parts in the position herein shown in which the valve is closed, the cooling action of the air surrounding the valve will gradually cool the thermostatic members 25 to cause them to contract and in this manner retract the baffle member 22 and permit the ball 21 to leave the valve seat 20 and thus open the valve to permit discharge from the radiator through the valve. This discharge may comprise air, water, or steam, or any mixture thereof. Air entering the thermostatic valve will not be at a temperature high enough to cause the thermostatic members 25 to expand sufficiently to seat the ball 21. Water entering the valve may be at substantially that temperature but will be deflected by the baffle plate 22 and therefore substantially kept from contact with the thermostatic members 25 and in addition prevented from transferring its heat through the baffle plate 22 to the thermostatic members 25 because of the heat insulating members 23 interposed between the baffle plate 22 and the thermostatic members 25 and accordingly water will be ineffective to cause an expansion of the thermostatic members 25 sufficient to seat the ball 21. On the other hand, steam entering the valve will surround the baffle plate 22 and come into direct contact with the thermostatic members 25 to cause them to rapidly expand to seat the ball 21 to the extent necessary to prevent further discharge of steam.

In many cases, the extent of expansion of the thermostatic members 25 may be sufficient to entirely seat the ball 21 in which case the ball 21 will remain seated until the surrounding air has sufficiently cooled the thermostatic members 25 to cause them to again contract and repeat the previous cycle of operation. In other cases, however, particularly when the valve is correctly adjusted and correctly proportioned to the radiator to which it is connected, the action of the thermostatic members 25 will follow so closely the first entrance of steam into the valve that the ball 21 will be seated to an extent sufficient to prevent the discharge through the valve of anything in addition to the condensation before sufficient steam has passed into the valve to cause the more extensive action of the thermostatic members 25 which would completely seat the ball 21. Under these circumstances the valve does not act between an open position and a closed position and discharge the condensation periodically but acts between a more open position and a less open position and discharges the condensation continually although in slightly varying amounts.

Heretofore, so far as I am aware, in order to prevent the inflow of air, and perhaps condensation, in response to the partial vacuum created in the radiator by the condensation of the steam therein after the radiator has been turned off, it has been common to insert into the return line leading from each radiator a check valve designed to prevent return flow into the radiator. In the structure herein disclosed, when the parts are properly adjusted this return flow will immediately carry the ball 21 against the seat 20 to close the valve against this return flow and maintain the valve thus closed as long as the vacuum is maintained within the radiator.

The utilization of a plurality of thermostatic members, and particularly three, supporting a single baffle plate provides a more uniform action which facilitates proper adjustment of the parts. In addition, the formation of the seat 20 upon a plug 18 adjustable in the casing member 11 obviously permits ready adjustment of the valve seat 20 to position the valve seat 20 at that distance from the baffle plate 22 which will insure the seating of the ball 21 in response to vacuum in the radiator and in addition will produce such an adjustment of the valve as to cause it to normally function by the more desirable continued discharge of the condensation rather than by intermittent discharge thereof.

It will be apparent to those skilled in the art that the valve herein shown eliminates many of the defects existing in the valves heretofore developed and that the superiority of the within disclosed valve is particularly due to the presence of means adapted to deflect water from the thermostatic members and at least partially heat insulated from the thermostatic members, the superior action of the thermostatic element because of the provision of a plurality and particularly three thermostatic members acting in parallel, the means securing the thermostatic element to the casing sufficiently to prevent accidental removal therefrom but without distortion of the thermostatic element, the provision of the free ball adapted to seat at the beginning of any return flow into the radiator, and the provision of a seat readily adjustable to bring the various parts into the proper relation for the best operation. It will also be apparent to those skilled in the art that the particular valve herein shown may be variously modified without sacrificing the advantages thereof or departing from the spirit of my invention and that this disclosure is therefore illustrative only and my invention not limited thereto.

I claim:

1. In combination, an adjustable valve seat, a thermostatic element comprising a plurality of curved members each fixed at one end and a baffle plate carried by the free ends of said elements arranged to divert fluid from said elements, and a valve supported by said seat and said plate, arranged to cooperate with said seat, and operable, when said seat is properly adjusted, by said members through said plate and by a decrease in pressure in the duct communicating with said seat.

2. In a thermostatic valve, a thermostatic element comprising a plurality of curved thermostatic members, and a baffle plate carried by the movable ends of said members heat insulated therefrom and arranged to divert liquid and thus substantially prevent liquid reaching said members.

3. In combination: a valve seat; a valve arranged to seat therein; and a thermostatic unit comprising a plurality of parallelly acting thermostatic elements controlling the action of a part independent of said valve, and said part acted on by said elements and itself arranged to engage and seat said valve regardless of irregularity in the valve seating movement of said part, heat insulated from said elements, and formed and positioned to prevent the flow of fluid directly against said elements.

4. In combination; a valve seat a valve arranged to seat therein; and a thermostatic unit comprising a plurality of parallelly acting thermostatic elements controlling the action of a part independent of said valve, and said part acted on by said elements, itself arranged to engage and seat said valve regardless of irregularity in the valve seating movement of said part, and formed and positioned to prevent the flow of fluid directly against said elements.

In testimony whereof, I hereunto affix my signature.

BRUCE B. PRESTON.